United States Patent [19]

Delvaux et al.

[11] Patent Number: 5,445,849
[45] Date of Patent: Aug. 29, 1995

[54] PROCESS FOR THE MANUFACTURE OF SAFE AND EASY-TO-TRANSPORT PELLETS OF CHRYSOTILE ASBESTOS

[75] Inventors: Pierre Delvaux, Bromptonville; Pierre Legast, Sherbrooke; Normand Lesmerises, Rock Forest; Eric Beerli, Sherbrooke, all of Canada

[73] Assignee: Ceram SNA Inc., Sherbrooke, Canada

[21] Appl. No.: 152,386

[22] Filed: Nov. 16, 1993

[51] Int. Cl.⁶ .............................................. B05D 7/00
[52] U.S. Cl. ................................ 427/215; 427/372.2; 588/254
[58] Field of Search ............................ 427/215, 372.2; 588/254

[56] References Cited

U.S. PATENT DOCUMENTS

| | | |
|---|---|---|
| 3,623,858 | 11/1971 | Smith et al. ............................ 71/62 |
| 3,928,060 | 12/1975 | Smith et al. ........................... 427/215 |
| 5,028,266 | 7/1991 | Rettenmaier .......................... 106/282 |
| 5,118,544 | 6/1992 | Delvaux et al. ....................... 428/345 |

FOREIGN PATENT DOCUMENTS 1244817 11/1988 Canada .

OTHER PUBLICATIONS

"Guidelines for the Use of Encapsulants on Asbestos-Containing Materials", Office of Toxic Substances, United States Environmental Protection Agency, Jun. 1981.

*Primary Examiner*—Shrive Beck
*Assistant Examiner*—David M. Maiorana
*Attorney, Agent, or Firm*—Foley & Lardner

[57] ABSTRACT

Disclosed is a process for manufacturing of pellets of chrysotile asbestos fibers, wherein asbestos fibers containing from 5 to 20% by weight of water are pelletized to form wet pellets that are subsequently dried until their residual water content reaches 0 to 1% by weight. Then, an aqueous solution or suspension of a substance compatible with the intended use of the pellets is sprayed onto the same to form a selective protective coating that eliminates release of asbestos dust and airborne particles. The obtained pellets have excellent mechanical properties that make them easy to handle, thereby allowing safe and easy transportation of chrysotile asbestos in bulk.

10 Claims, No Drawings

PROCESS FOR THE MANUFACTURE OF SAFE AND EASY-TO-TRANSPORT PELLETS OF CHRYSOTILE ASBESTOS

BACKGROUND OF THE INVENTION a) Field of the Invention

The present invention relates to a process for manufacturing pellets of chrysotile asbestos that are particularly useful for the transportation in bulk of this mineral. More particularly, the present invention relates to a process for the manufacturing pellets of chrysotile asbestos, which comprises two basic steps, namely the pelletizing of asbestos fibers followed by the spraying onto the pellets, of a coating that is compatible with the subsequent use of the pellets and reduces to almost zero the release of dust and air-borne fibers during transportation and use of the pellets.

The invention also relates to the coated pellets of chrysotile asbestos fibers obtained by this process.

b) Brief Description of the Prior Art

It is of common practice throughout the world, to transport industrial minerals in bulk. For some applications, it is also of common practice to condition the minerals in order to facilitate their handling. As an example of such a conditioning, reference can be made to the pelletizing of iron ore. As a matter of fact, pelletizing which is also called "agglomeration", is a widely used technique for the treatment of fine iron ore concentrates, which otherwise could not be easily handled, shipped or charged to a blast furnace. This technique is also used for the production of direct reduced iron.

In this connection, reference can be made to U.S. Pat. application Ser. No. 07/844,281 filed on Mar. 2, 1992, in the name of the Applicant, which discloses a self-fluxing binder composition for use in the pelletizing of ore concentrates, comprising a mixture of a fluxing material selected from the group consisting of natural and synthetic magnesium or calcium bearing minerals, and a water soluble organic substance selected amongst natural polysaccharide of high viscosity.

As aforesaid, pelletizing is a technique that has been successfully applied to a wide variety of materials, such as fertilizer, coal chemicals, nonmetallic minerals, industrial wastes and the like to make handling, shipping or use of these materials much easier to carry out.

Pelletizing has also been used on chrysotile asbestos, to make this mineral easier to handle.

Thus, for example, U.S. Pat. No. 3,623,858 granted on Nov. 30, 1971 to JOHNS-MANVILLE CORPORATION discloses a method for pelletizing serpentine chrysotile fines by addition thereto of an aqueous solution containing 5 to 10% by weight of a mineral acid which is preferably sulphuric acid, and subsequent accretion of this mixture into pellets.

Canadian patent No. 1,244,817 granted on Nov. 15, 1988 to INSTITUT DE L'AMIANTE discloses, in its example 1, the formation of chrysotile asbestos pellets for use as a filter to remove cancer-causing compounds from exhaust fumes. The pellets are produced by addition of bentonite and sufficient water to wet the dry fibers, and subsequent pelletizing of the resulting mixture in a rotating disk pelletizer. After they are formed, the pellets are dried to harden them and make them dust free.

U.S. Pat. No. 5,028,266 granted on Jul. 2nd, 1991 to Mr. Stephan RETTENMAIER discloses the formation of granulates of chrysotile asbestos for use as an additive in a liquid bitumen mass. In a first step, the fibers are coated with a binding agent which is preferably bitumen. Then, the coated fibers are agglomerated. The resulting granules are intended to be admixed with liquid bitumen until they are dissolved in it.

The above-mentioned prior art clearly shows that pelletizing of chrysotile asbestos fibers with water and a binder is a known technique. However, to the Applicant's knowledge, the prior art in this field has never addressed what is now the major issue in the transportation, handling and use of chrysotile asbestos, namely reduction and, ideally, elimination of the release of asbestos dust or air-borne asbestos that can be a health hazard for those in contact with this mineral, even though there exists a substantial number of publications dealing with this problem and suggesting different ways of eliminating or substantially reducing the release of asbestos dust and particles in the ambient air during handling this mineral. On this matter, reference can be made, for example, to the "Guidelines for the use of encapsulants of asbestos-containing materials" published on June 1981 by the Chemical Control Division of the EPA's Office of Toxic Substances, with the help of Mr. William MINICK of the Batelle Columbus Laboratories.

OBJECT AND SUMMARY OF THE INVENTION

The object of the present invention is to provide a process for manufacturing pellets of chrysotile asbestos fibers that can be used to transport and handle this mineral in a very safe and efficient manner, which process is, on the one hand, very simple as compared to the known pelletizing processes inasmuch as it does not call for any binder, and, on the other hand, much more efficient than the known processes inasmuch as the resulting pellets are provided with a selective protective coating that eliminates the release of asbestos dust and air-borne particles.

The process for the manufacture of coated pellets of chrysotile asbestos fibers according to the present invention comprises the steps of:

A) forming pellets of asbestos fibers by:
 i) pelletizing chrysotile asbestos fibers containing from 5 to 20% and preferably from 10 to 15% by weight of water, thereby forming wet pellets; and
 ii) drying these wet pellets to obtain dry pellets having a residual water content of 0 to 1% by weight; and B) applying a selection protective coating onto the dry pellets obtained in step (A) by:
 iii) spraying onto the dry pellets from 5 to 20% and preferably from 10 to 15% by weight based on the weight of these dry pellets, of an aqueous solution or suspension of a substance compatible with the intended use of the pellets that are being manufactured; and
 iv) drying the pellets that have been sprayed, so as to reduce their residual water content to 0 to 1% by weight.

The pelletizing step (i) of the process according to the invention can be carried out in a disk pelletizer or in a balling drum. This step can also be carried out by any other conventional technique, such as briqueting or agglomeration.

The binder that is used in the pelletizing step (i) is essentially water that is sprayed onto the fibers while the same are pelletized. In accordance with the invention, it has been found that spraying of a quantity of 5 to 20% preferably 10 to 15% by weight of water onto the chrysotile asbestos fibers is sufficient to form pellets having a strong cohesion.

The wet pellets that are so obtained are subsequently dried in step (ii) until their residual water content is ranging between 0 and 1% by weight.

Then, in step (iii), an aqueous solution or suspension of a substance capable of forming a coating is sprayed onto the dry pellets. More particularly, from 5 to 20% by weight of such an aqueous solution of suspension is sprayed onto the dried pellets, the above percentages being based on the weight of dry pellets.

It has surprisingly been found by the Applicant that the aqueous solution or suspension that is sprayed onto the pellets, is selectively filtered on the surface of the same. As a result of such a filtration, water penetrates within the pellets while the substance in solution or suspension remains on the surface of the pellets and forms a continuous coating onto the same, which completely masks the asbestos fibers and thus prevents release of asbestos dust or air-borne particles.

Of course, it is compulsory that the substance that is used as a coating be compatible with the intended use of the pellets that are being manufactured. By way of example, if the asbestos pellets are intended to be used as an additive to asphalt or bitumen applied onto a road, it is compulsory to use a substance that produces a coating compatible with asphalt. This coating can be a coal tar suspension like the one manufactured by USE HICKSON of Scarborough, Ontario, which is sold under the trademark MASTERCRAFT as a "driveway sealer".

In the last step (iv) of the process according to the invention, the pellets on which the coating has been applied, are dried so as to reduce the residual water content to 0 to 1% by weight.

Of course, the invention is also concerned with the pellets obtained by the above process, that pellets are made of chrysotile asbestos fibers and have a coating which is compatible with the intended use of the pellets and that substantially reduce release of asbestos dust and air-borne particles during transportation and subsequent use thereof.

The invention and its advantages will be better understood upon reading the following, non restrictive description of the manufacture of coated pellets of chrysotile asbestos fibers for use as an additive to asphalt. However, as will be understood upon reading the examples given hereinafter, the invention is not exclusively restricted to this very specific use.

DETAILED DESCRIPTION OF THE INVENTION

A) Formation of pellets of asbestos fibers

The first step of the process according to the invention consists in forming pellets of chrysotile asbestos fibers.

As aforesaid, the fibers can be pelletized in a disk pelletizer, or in a bailing drum. Pelletizing can also be carried out by briqueting or agglomeration.

In the example now given for the purpose of illustrating each of the steps of the process according to the invention, 5 kg of short asbestos fibers of grade 7TS produced by JM ASBESTOS INC. of Asbestos (Province of Quebec) were manually deposited into a rotating disc pelletizer having a diameter 100 cm and a depth of 20 cm. This pelletizer was mounted on a support that was angularly adjustable and was provided with a ⅓HP, variable speed motor.

For pelletizing asbestos fiber, the optimum inclination is of 45° to 55° and the optimum rotation speed is of about 18 r.p.m.

While this pelletizer was rotating, 1 kg of water was sprayed at a rate of 2 liters per hour, using a spraying gun sold by SPRAYING SYSTEMS CORP. of Weaton, Ill., under the trademark 30 GUNJET. This gun is operating under pressure of 40 to 60 psi.

As soon as spraying was started, small pellets called "seeds" and having a diameter of 2 to 4 mm, were formed. When such cores were formed, additional asbestos fibers of grade 7TS was fed into the pelletizer at a rate of 20 to 30 kg per hour while water was sprayed at a rate of 2 to 5 kg per hour. This allows the seeds to grow and pellets having a diameter of 9 mm to be produced in a continuous manner. In this connection, it has been found that new seeds are formed in the bottom of disc and grow up in the rotating mass while pellets having a diameter of 6 to 9 mm overflow out of the disc.

In a second step, the pellets that were so formed were dried at a temperature of about 110° C. for about 5 hours in order to reduce their residue water content to 0 to 1% by weight, and allowed to cool.

B) Application of a coating

As explained hereinabove, the substance that was used for the formation of a coating on the pellets is a substance compatible with asphalt so that the resulting pellets are transportable and useful as an additive for a road coating.

For this purpose, it was of course necessary to use a substance compatible with asphalt. In this connection, use was made of the coal tar suspension sold as a driveway sealer by USE HICKSON of Scarborough, Ontario, under the trademark MASTERCRAFT. This coal tar suspension consists of an emulsion containing 40% by weight of solids in water. In use, this emulsion was further diluted at a ratio of 1 part of suspension per 1 part of water, in order to allow regular spraying of the same.

Then, 10 kg of the dried and cooled pellets previously obtained were reintroduced in the disc pelletizer and were sprayed with the dilute suspension of coal tar prepared as disclosed hereinabove, at a rate of 50 to 60 kg per hour.

Tests carried out by the Applicant have shown that best results are obtained when 5 to 20%, and more preferably 10 to 15% by weight of suspension based on the weight of the dried pellets, is sprayed onto the same.

Under this condition, it was surprisingly found that water immediately penetrates inside the pellets by capillarity while the solids in suspension are deposited on the surface of the pellets in a regular and uniform manner. There was no excess of liquid during spraying and the pellets were always in a dry state, thereby avoiding any sticking of the pellets or formation of irregularities onto the coating.

It has also been found that if less than 5% by weight of aqueous solution or suspension is used, based on the weight of dry pellets, the coating that is formed is not regular. On the other hand, if use is made of more than 20% of aqueous solution or suspension, the pellets loose their dry state and have a tendency to agglomerate, to stick to each other and even to break.

In this connection, it is worth mentioning that the amount of solid material in suspension or solution must have a stability sufficient to avoid sedimentation and simultaneously to provide a solution or suspension whose viscosity is compatible with spraying and which allows formation of a uniform coating onto the surface of the pellets.

The pellets that were so sprayed, were then dried at a temperature of about 110° C. for about 5 hours. Visual and microscopic examination was carried out and have shown that the solid material that was deposited onto the surface of the pellets, formed a uniform coating.

C) Characterization of the pellet properties

In the iron ore pelletizing industry, the properties of the pellets at the green, dry and fired stages are measured on the tested products because they are considered to be of practical importance for pellet characterization. For the mechanical characteristic, the three following properties are tested: drop number, wet compression strength and dry compression strength.

Drop number

The drop number is an important qualitative indicator of the resistance of the green pellets to fracture by impact without undue permanent deformation. Normally pellets with at least 7 to 15 or higher drops from a height of 45 cm onto a hard smooth surface without revealing any cracks or breaking are considered good pellets. Such pellets would have the ability to withstand handling during the manufacturing process.

Wet compression strength

This test is used to determine whether the green pellets have sufficient strength to withstand compressive forces encountered during conveying, transportation and screening for the subsequent drying and manufacturing operation. The testing is normally accomplished in a hydraulic press or a mechanical device. The wet compressive strength is the maximum load a green pellet can withstand. In general, an acceptable wet compression strength is in the range of 1–1.5 kg/pellet or higher.

Dry compression strength

The pellet dry compression strength is a very important criteria as the pellets become brittle and are prone to brittle fracture following loss of free water.

Generally, an acceptable dry compression strength is in the range of 3 to 5 kg per pellet.

In the above embodiment, the drop member, the wet compression strength and the dry compression strength were measured at the different steps of the manufacturing process in order to evaluate the mechanical resistance of the pellets. These measured values are reported in Table I

TABLE I

| | PELLETS PROPERTIES | | | |
|---|---|---|---|---|
| | PELLETIZING | | COATING | |
| PROPERTIES | WET | DRY | WET | DRY |
| Drop number | 87 | 70 | 49 | 70 |
| Wet compression strength (kg/pellet) | 5.0 | — | 4.3 | — |
| Dry compression strength (kg/pellet) | — | 6.0 | — | 6.3 |

The above-mentioned values have proved to be sufficient in practice for the transportation and handling of asbestos. As a matter of fact, these values measured onto the asbestos pellets are higher than those usually considered as acceptable in the iron ore industry.

D) Measurement of the amount of asbestos and dust air-borne fibers released in air Two different kinds of measurement were used for measuring the amount of asbestos dust or air-borne fibers released in the ambient air. On the one hand, handling of asbestos pellets was simulated according to the tumbler test standard for iron ore pellets and sinter ASTM E279-69. On the other hand, measurement of the number of asbestos fibers released in the air has been made by using the conventional method used in the asbestos industry.

The apparatus used for measuring the asbestos dust release comprised a closed 60 cm×60 cm×45 cm test chamber in which a cylindrical metallic container was mounted for rotation on driving rollers. The container had a length of 19 cm and diameter of 15 cm and was intended to receive the pellets to be tested. The container was perforated over its full length with holes having a diameter of 4.7 mm. During testing, an airflow was circulated in a closed loop within the chamber to allow homogeneous suspension of the release dust. The airflow was generated by a fan whose air inlet was located on top of the chamber. The air drawn by the fan was returned to the bottom of the chamber by 27 cm×3 cm oval-shaped outlet. Rotation of the container about its axis was achieved with a set of rollers driven by a variable speed motor.

The closed chamber was cleaned and the efficiency of its cleaning was checked by an air filtration carried out with the metallic container still empty. For this purpose, the chamber was sealed and the rollers were driven for 10 min. Air was circulated at a flow rate of 2 liters per minute and filtered onto a Millipore filter of 0.8 micron mounted on an Aerosol monitor MAW P025AC. The dust collected onto the filter was checked by phase contrast optical microscopy and the amount of respirable asbestos fibers whose length was higher than 5 micron was expressed as a number of fibers per $cm^3$ according to the IRSST 243-1 and NIOSH 7400 standards.

After testing of the measurement apparatus while the container was empty, 500 g of asbestos pellets were placed in the metallic container. The container was then placed again onto the motorized set of rollers. The closed chamber was sealed again and the set of rollers was driven to rotate the metallic container at a speed of 50 r.p.m.

The pellets then underwent mechanical attrition for 10 minutes. During this period, air was circulated at a flow rate of 2 liters per minute. Collection of the asbestos fibers and dust was made in the very same manner as before. The amount of air-borne asbestos fibers coming from the pellets was measured by counting, and their concentration in air was calculated.

The pellets were then collected and weighted. The percentage of dust and fibers released by mechanical attrition of 500 g of pellets was calculated.

The concentration of air-borne fibers and the amount of dust that were collected during the tests carried out with pellets manufactured by the process disclosed hereinabove are reported in Table II, which gives the result of the measurements that were obtained without pellets, with pellets without a coating and with pellets with a coating.

TABLE II

| | ASBESTOS DUST MEASUREMENT | |
|---|---|---|
| TEST | AIRBORNE ASBESTOS FIBERS FIBERS/CM$^3$ | ASBESTOS DUST % |
| Without pellets | <0.1 | — |
| With pellets without coating | 13.0 | 2.5 |
| With pellets with coating | 0.5 | 0.0 |

The asbestos pellets without a coating have lost 2.5% by weight and have generated 13 air-borne asbestos fibers per cm$^3$ within the chamber whereas the asbestos pellets with a coal tar suspension coating have not lost any measurable weight and have generated only 0.5 air-borne asbestos fibers per cm$^3$.

It is worth mentioning that similar tests carried out on bitumen chunks embedding 1.5% of asbestos fibers of grate 7TS carried out according to the Marshall method standardized by ASTM D1559, have shown characteristics similar to the ones obtained with the coated asbestos fiber pellets according to the invention.

Thus, the process for manufacturing safe and easy-to-transport pellets of chrysotile asbestos according to the invention substantially reduces the amount of air-borne fibers released during handling. As explained hereinabove, this process basically comprises the following steps:

1) formation of asbestos pellets by spraying 5 to 20% by weight of water onto the fibers and subsequently drying of the obtained pellets to reduce their residual water content to 0.1%; and 2) spraying of an aqueous suspension or solution of a substance compatible with the intended use of the pellets. During this operation, the water contained in the suspension or the solution is absorbed in a selective manner by the pellets and the substance in suspension or in solution is deposited on the surface of the pellets to form a uniform and continuous coating.

As aforesaid, in the above detailed description of the invention, reference has exclusively been made to an aqueous suspension of a substance compatible with the use of the pellets as additives to asphalt. However, other types of aqueous suspension can been used for the formation of a coating that is compatible with other applications of the asbestos pellets, as will be better understood upon reading the following, non-restrictive examples.

EXAMPLES

Example 1

An aqueous suspension compatible with the use of asbestos fibers as an additive to asphalt was prepared from gilsonite, latex and a tensio-active agent. The gilsonite that was used was the one of grade 350 sold by AMERICAN GILSONITE COMPANY of Salt Lake City (Utah). The latex that was used was the one sold under the trademark VULTEX 25-28130-3 by NACAN. The tensio-active agent was the one sold under the trademark DOWFAX 2A1 by DOW CHEMICAL.

Gilsonite is a natural product made of solidified hydrocarbons, which is used in particular as a filler in the asphalt-based compounds or scellants.

A stable suspension of gilsonite was prepared by adding 0.03% by weight of tensio-active agent in water and then by adding under stirring 5 to 15% of gilsonite and 3% of latex.

10 kg of dried and cooled asbestos pellets were introduced into a disc pelletizer. Then, the suspension of gilsonite prepared as disclosed above was sprayed at a rate of 50 to 60 kg per hour. An amount of 10 to 15% by weight of suspension based on the weight of the asbestos pellets resulted in an immediate penetration of the water by capillarity inside the asbestos pellets, and in the deposit of a coating of gilsonite and latex in a regular and uniform manner. There was no excess of liquid during spraying and the pellets were always in a dry state. The pellets were subsequently dried at 110° C. for 5 hours.

Measurement of the asbestos dust release fibers and has shown that for 500 g of asbestos pellets rotated for 10 min. at 50 r.p.m. in the above-mentioned apparatus, no measurable loss of weight was noticed for the coated pellets and that the amount of fibers released in air was equal to only 0.5 fiber per cm$^3$.

Example 2

An aqueous suspension compatible with the use of asbestos fibers in a friction material was prepared from graphite powder and latex. The graphite powder was of the type sold under the tradename GRAPHITE No. 8020 by ASBURY GRAPHITE MILLS INC. (New Jersey). This graphite powder is a kind of powder that is used in friction materials like the one disclosed in U.S. patent application Ser. No. 07/465,979 filed in the name of the Applicant. This graphite powder is compatible with the process of manufacture and use of friction materials. The latex that was used, is the one sold under the trademark VULTEX.

A stable suspension was prepared by adding to water under stirring, 5 to 15% by weight of graphite and 3% by weight of latex.

10 kg of dried and cooled asbestos pellets were introduced into a disc pelletizer. Then, the suspension prepared as disclosed hereinabove was sprayed at a rate of 50 to 60 kg per hour. Spraying of 10 to 15% by weight of this suspension based on the weight of the asbestos pellets, resulted in the application of a coating onto the surface of the pellets, as disclosed in example 1.

Measurement carried out on the coated asbestos pellets have shown that for 500 g of asbestos pellets rotated for 10 min. at 50 r.p.m. in the above mentioned apparatus, no measurable loss of weight was noticed and the amount fibers released in air was equal to 0.5 fiber per cm$^3$.

Example 3

An aqueous solution compatible with the use of asbestos fibers in a paper or millboard product was prepared from starch. The starch that was used was the one sold under the trademark EMPRESOL N by EMSLAND-—STARKE of Germany. This starch which is cationic, is the one used in vacuum forming processes like the one disclosed in U.S. Pat. No. 5,118,544. Accordingly, this starch is compatible with the manufacture and use of asbestos papers and millboard.

A solution of starch was prepared by diluting 3 to 5% by weight of starch in water. Spraying of 5 to 15% by weight of solution based on the weight of the pellets resulted in the formation of a coating in the same way as disclosed in example 1. The pellets were dried for 5 hours at a temperature of 110° C.

Measurement of the asbestos fibers and dust release has shown that for 500 g of asbestos pellets rotated for 10 min. at 50 r.p.m. in the above mentioned apparatus, no measurable loss of weight was noticed and the amount of fibers released in air was equal to 0.5 fiber per cm$^3$.

Example 4

An aqueous solution compatible with the use of asbestos fibers in an asbestos cement product was prepared from sodium silicate. The sodium silicate that was used, was the one of grade N sold by NATIONAL SILICATE LTD., of Valleyfield (Province of Quebec). Chrysotile asbestos fibers sprayed with sodium silicate are commonly used in the production of flat plates of asbestos cement using Hatchek machines to do so, and of tubes of asbestos cement using Mazza machines to do so. These fibers improve the capacity of filtration and of elimination of water in the processes of manufacturing asbestos cement products of the "humid" type.

The asbestos pellets that were used were manufactured with a mixture containing 25% of fibers of grade 4T30 and 75% of fibers of grade 7D, as sold by JM ASBESTOS INC. This type of mixture is very similar to those used in the asbestos cement industry.

The process for manufacturing the pellets was identical to the one disclosed hereinabove. A given amount of short asbestos fibers of grade 7D was manually deposited into a rotating disc pelletizer and water was sprayed at a rate of 3 to 5 liters per hour. Seeds were formed and the disc pelletizer was then continuously fed with a mixture of 25% of fibers 4T30 and 75% of fibers of grade 7D while water was sprayed at a rate of 3 to 5 liters per hour. The pellets that were so formed, were dried at a temperature of 110° C. for 5 hours and cooled before being placed against in the disc pelletizer.

A solution of sodium silicate was prepared by diluting in water from 20 to 30% by weight of sodium silicate of grade N. An amount of 10 to 15% by weight of solution based on the weight of the asbestos pellets was sprayed onto the same to form the requested coating. The coated pellets were dried for 5 hours at a temperature of 110° C.

Measurement of the asbestos fibers and dust released has shown that for 500 g of asbestos pellets rotated for 10 min. at 50 r.p.m. in the above mentioned apparatus, no measurable loss of weight was noticed and the amount of fibers released in air was equal to 0.5 fiber per cm$^3$.

What is claimed is:

1. A process for manufacturing of coated pellets of chrysotile asbestos fibers, comprising the steps of:
    A) forming said pellets of asbestos fibers by:
        i) pelletizing chrysotile asbestos fibers exclusively with from 5 to 20% by weight of water, thereby forming wet pellets; and
        ii) drying said wet pellets to obtain dry pellets having residual water content of 0 to 1% by weight; and
    B) applying a selection protective coating onto the dry pellets obtained in step (A) by:
        iii) spraying onto the dry pellets from 5 to 20% by weight based on the weight of said dry pellets, of an aqueous solution or suspension of a substance compatible with the intended use of the pellets that are being so manufactured; and
        iv) drying the pellets that have been sprayed, so as to reduce their residual water content from 0 to 1% by weight.

2. The process of claim 1, wherein the pelletizing step (i) is carried out in a disc pelletizer.
3. The process of claim 1, wherein the pelletizing step (i) is carried out in a balling drum.
4. The process of claim 1, wherein, in the pelletizing step (i), said wet pellets are formed by briqueting.
5. The process of claim 1, wherein, in the pelletizing step (i), said wet pellets are formed by agglomeration.
6. The process of claim 1, wherein the pelletizing step (i), is carried out with from 10 to 15% by weight of water and the spraying step (iii) is carried out with from 10 to 15% by weight of said aqueous solution or suspension, based on the weight of said chrysotile asbestos fibers.
7. A process for manufacturing of coated pellets of asbestos fibers capable of being mixed and used with asphalt, comprising the steps of:
    A) forming said pellets of asbestos fibers by:
        i) pelletizing chrysotile asbestos fibers with from 5 to 20% by weight of water, thereby forming wet pellets; and
        ii) drying said wet pellets to obtain dry pellets having residual water content of 0 to 1% by weight; and
    B) applying a selection protective coating onto the dry pellets obtained in step (A) by:
        iii) spraying onto the dry pellets from 5 to 20% by weight, based on the weight of said dry pellets, of an aqueous solution or suspension of a substance compatible with the intended use of the pellets that are being so manufactured; and
        iv) drying the pellets that have been sprayed, so as to reduce their residual water content from 0 to 1% by weight, wherein the spraying step (iii) is carried out with an aqueous suspension containing from 5 to 15% by weight of gilsonite, based on the total weight of said aqueous suspension.
8. A process for manufacturing of coated pellets of asbestos fibers capable of being used in a friction material, comprising the steps of:
    A) forming said pellets of asbestos fibers by:
        i) pelletizing chrysotile asbestos fibers with from 5 to 20% by weight of water, thereby forming wet pellets; and
        ii) drying said wet pellets to obtain dry pellets having residual water content of 0 to 1% by weight; and
    B) applying a selection protective coating onto the dry pellets obtained in steps (A) by:
        iii) spraying onto the dry pellets from 5 to 20% by weight based on the weight of said dry pellets, of an aqueous solution or suspension of a substance compatible with the intended use of the pellets that are being so manufactured; and
        iv) drying the pellets that have been sprayed, so as to reduce their residual water content from 0 to 1% by weight,
    wherein the spraying step (iii) is carried out with an aqueous suspension containing from 5 to 15% by weight of graphite, based on the total weight of said aqueous suspension.
9. A process for manufacturing coated pellets of asbestos fibers capable of being used for preparing asbestos-containing paper or millboard products, comprising the steps of:

A) forming said pellets of asbestos fibers by:
  i) pelletizing chrysotile asbestos fibers exclusively with from 5 to 20% by weight of water, thereby forming wet pellets; and
  ii) drying said wet pellets to obtain dry pellets having residual water content of 0 to 1% by weight; and
B) applying a selection protective coating onto the dry pellets obtained in step (A) by:
  iii) spraying onto the dry pellets from 5 to 20% by weight based on the weight of said dry pellets, of an aqueous solution or suspension of a substance compatible with the intended use of the pellets that are being so manufactured; and
  iv) drying the pellets that have been sprayed, so as to reduce their residual water content from 0 to 1% by weight, wherein the spraying step (iii) is carried out with an aqueous solution containing 3 to 5% by weight of starch, based on the total weight of said aqueous suspension.

10. A process for manufacturing of coated pellets of asbestos fibers capable of being used for preparing products of the asbestos-cement type, comprising the steps of:

A) forming said pellets of asbestos fibers by:
  i) pelletizing chrysotile asbestos fibers exclusively with from 5 to 20% by weight of water, thereby forming wet pellets; and
  ii) drying said wet pellets to obtain dry pellets having residual water content of 0 to 1% by weight; and
B) applying a selection protective coating onto the dry pellets obtained in step (A) by:
  iii) spraying onto the dry pellets from 5 to 20% by weight based on the weight of said dry pellets, of an aqueous solution or suspension of a substance compatible with the intended use of the pellets that are being so manufactured; and
  iv) drying the pellets that have been sprayed, so as to reduce their residual water content from 0 to 1% by weight, wherein the spraying step (iii) is carried out with an aqueous solution containing 20 to 30% by weight of sodium silicate, based on the total weight of said aqueous suspension.

* * * * *